(12) United States Patent
Menger et al.

(10) Patent No.: US 9,803,426 B2
(45) Date of Patent: Oct. 31, 2017

(54) FLEX JOINT FOR DOWNHOLE DRILLING APPLICATIONS

(75) Inventors: Christian Menger, Recke (DE); Nobuyoshi Niina, Cheltenham (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 543 days.

(21) Appl. No.: 13/053,415

(22) Filed: Mar. 22, 2011

(65) Prior Publication Data

US 2011/0308858 A1 Dec. 22, 2011

Related U.S. Application Data

(60) Provisional application No. 61/356,462, filed on Jun. 18, 2010.

(51) Int. Cl.
| | | |
|---|---|---|
| *E21B 7/06* | (2006.01) | |
| *E21B 17/05* | (2006.01) | |
| *F16C 11/06* | (2006.01) | |
| *F16C 11/12* | (2006.01) | |

(52) U.S. Cl.
CPC .............. *E21B 7/067* (2013.01); *E21B 17/05* (2013.01); *F16C 11/06* (2013.01); *F16C 11/12* (2013.01); *F16C 2233/00* (2013.01); *F16C 2352/00* (2013.01); *Y10T 29/49826* (2015.01); *Y10T 403/32557* (2015.01)

(58) Field of Classification Search
CPC .......... E21B 7/067; E21B 7/068; E21B 7/064; E21B 17/05; F16C 11/06; F16C 2361/53
USPC ..... 166/242.2, 242.6, 255.2; 175/61, 45, 73, 175/74, 320, 172, 56, 24; 403/122, 144, 403/145, 148, 113; 285/184; 464/18–20
See application file for complete search history.

(56) References Cited

U.S. PATENT DOCUMENTS

| | | | | |
|---|---|---|---|---|
| 2,925,251 | A | * | 2/1960 | Arps ............................... 175/39 |
| 5,139,094 | A | * | 8/1992 | Prevedel et al. ................ 175/61 |
| 5,769,558 | A | | 6/1998 | Jekielek |
| 5,797,453 | A | * | 8/1998 | Hisaw ........................ 166/117.5 |
| 5,808,191 | A | * | 9/1998 | Alexy et al. ............... 73/152.03 |

(Continued)

FOREIGN PATENT DOCUMENTS

| | | |
|---|---|---|
| RU | 2039188 | 7/1995 |
| RU | 2055140 | 2/1996 |

(Continued)

OTHER PUBLICATIONS

Universal_joint—Wikipedia—Nov. 10, 2014—http://en.wikipedia.org/wiki/Universal_joint.*

(Continued)

*Primary Examiner* — George Gray

(57) ABSTRACT

A technique facilitates drilling applications by providing a unique flex joint. In one embodiment, the flex joint has an adjustable bending stiffness while being much more compact than conventional flex joints. The flex joint also may be designed to de-couple bending moments from the tool joints and, in some applications, can operate as an active vibration and shock control sub by incorporating suitable sensors and a hydraulic actuator system. The design also enables incorporation of other features, such as electrical insulation features disposed above and/or below the flex joint. In some applications, the flex joint also may have an electrical feed through.

7 Claims, 2 Drawing Sheets

(56) References Cited

U.S. PATENT DOCUMENTS

| | | | |
|---|---|---|---|
| 5,836,388 A | 11/1998 | Tchakarov | |
| 7,134,512 B2 | 11/2006 | Head | |
| 7,270,198 B2 * | 9/2007 | Camp | 175/61 |
| 7,540,339 B2 | 6/2009 | Kolle | |
| 7,748,474 B2 * | 7/2010 | Watkins et al. | 175/56 |
| 2003/0121702 A1 | 7/2003 | Downton et al. | |
| 2006/0042792 A1 | 3/2006 | Connell | |
| 2007/0289778 A1 | 12/2007 | Watkins et al. | |

FOREIGN PATENT DOCUMENTS

| | | |
|---|---|---|
| RU | 2229012 | 5/2004 |
| UA | 28665 | 12/2007 |
| WO | 2006/065923 | 6/2006 |
| WO | 2009/102220 | 8/2009 |

OTHER PUBLICATIONS

International Search Report for the equivalent PCT patent application No. PCT/IB2011/001972 issued on Jan. 24, 2013.
Office action for the equivalent Russian patent application No. 2013102304 issued on Mar. 25, 2014.
Decision on grant for the equivalent Russian patent application No. 2013102304 issued on Jun. 18, 2014.
Office action for the equivalent Chinese patent application No. 201180030168.1 issued on Aug. 4, 2014.

* cited by examiner

FLEX JOINT FOR DOWNHOLE DRILLING APPLICATIONS

CROSS-REFERENCE TO RELATED APPLICATION

The present document is based on and claims priority to U.S. Provisional Application Ser. No. 61/356,462, filed Jun. 18, 2010, incorporated herein by reference.

BACKGROUND

In downhole drilling applications, flex joints are sometimes used to facilitate directional drilling. The flex joints can be useful in steerable drilling applications to provide a bottom hole assembly with sufficient flexibility to allow deflection of the borehole. Conventional flex joints are long, necked-down sections of pipe having a lower bending stiffness than other components of the bottom hole assembly.

SUMMARY

In general, the present invention provides a flex joint having substantially improved capabilities for use in a wider variety of drilling applications. In one embodiment, the flex joint has an adjustable bending stiffness while being much more compact than conventional flex joints. The flex joint also may be designed to de-couple bending moments from the tool joints and, in some applications, can operate as an active vibration and shock control sub by incorporating suitable sensors and a hydraulic actuator system. The design also enables incorporation of other features, such as electrical insulation features disposed above and/or below the flex joint. In some applications, the flex joint also may have an electrical feed through.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a system and methodology to facilitate directional drilling by incorporating a flex joint into a drill string. The flex joint may be used to provide a bottom hole assembly with a sufficient flexibility to better allow deflection of the wellbore being drilled. The flex joint may be designed to provide variable stiffness in a compact structure. In some embodiments, the flex joint may be adjusted to vary the allowed angle of deflection. In other embodiments, the flex joint may comprise an in-line integrated stabilizer. Additionally, the flex joint may be employed in a variety of rotary steerable drilling applications to facilitate directional drilling.

Figure 1:
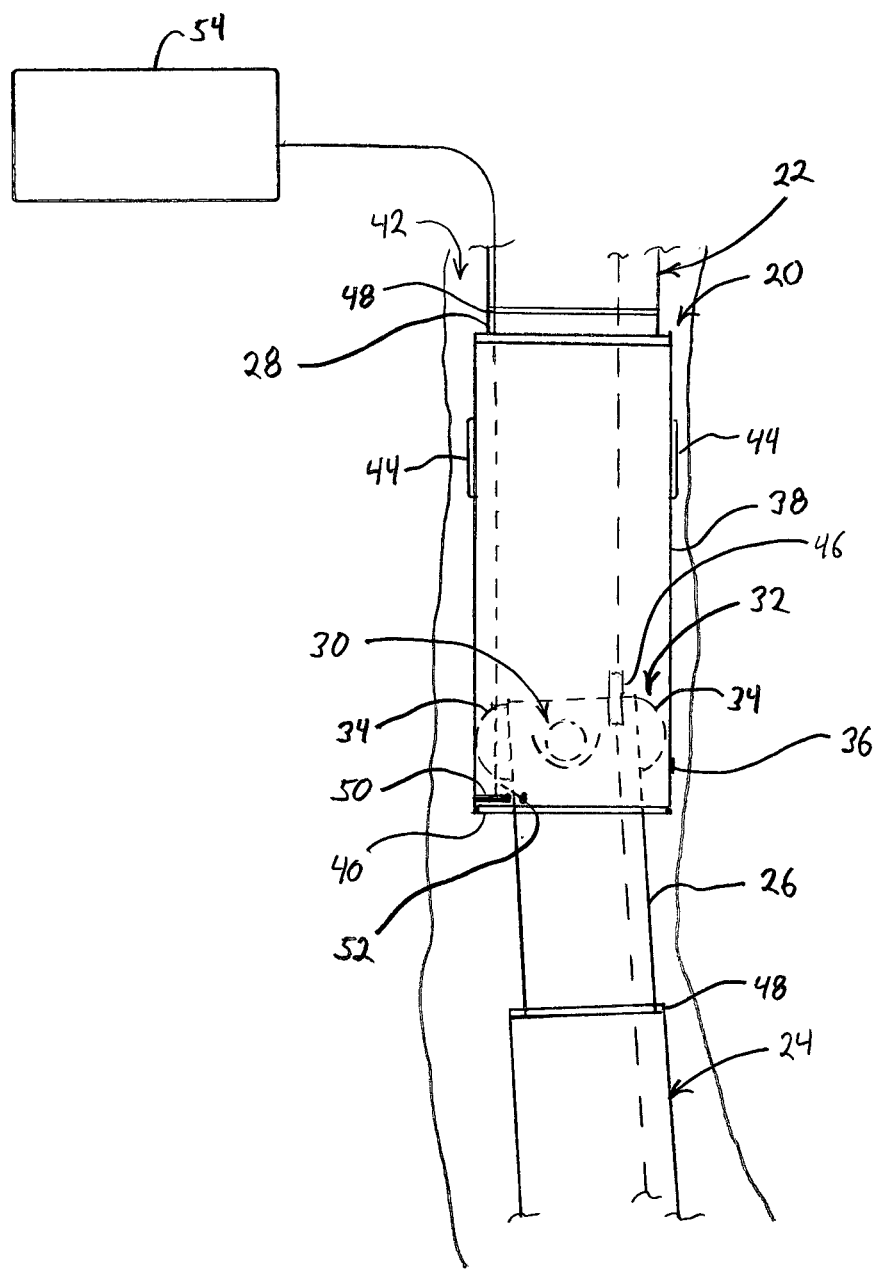
FIG. 1 is a schematic illustration of a flex joint incorporated into a drill string to facilitate directional drilling, according to an embodiment of the present invention.

Referring generally to FIG. 1, an embodiment of a flex joint 20 is illustrated as coupled into a drill string 22 which may comprise a bottom hole assembly 24 located on a downhole side of flex joint 20. In drilling applications, the bottom hole assembly 24 may comprise a rotary steerable system for steering a drill bit. In the illustrated example, flex joint 20 comprises a first component 26 coupled to a second component 28 via a universal joint 30, such as a Hooke's Joint type of universal joint. The first component 26 may be pivoted with respect to the second component 28 about the universal joint 30 to form a bend angle. The design of the flex joint 20 and universal joint 30 provided a solid joint which may be subjected to high loading.

In the embodiment illustrated, the flex joint 20 incorporates an internal, adjustable spring assembly 32, which may be adjusted to provide a variable bending stiffness of the first component 26 relative to the second component 28. For example, spring assembly 32 may comprise a plurality of bow springs 34 which may be selectively adjusted by an external adjustment mechanism 36 to vary the bending stiffness. However, spring assembly 32 also may utilize other types of springs, e.g. torsion springs, coil springs, or tension springs.

The flex joint 20 may further comprise a sleeve 38 connected to one of the components 26, 28 and extending past the universal joint 30 to shield the universal joint. By way of example, sleeve 38 may be rigidly connected to second component 28 at a position which allows the sleeve to extend past the universal joint 30 and to cover a portion of the first component 26. This allows sleeve 38 to be used to limit the maximum offset/bend angle of the flex joint. In fact, adjustment mechanisms 40, such as split rings, can be mounted to sleeve 38 to limit the pivotable travel of the first component 26 with respect to the second component 28 and to thus selectively adjust the maximum offset/bend angle of the flex joint 20. The external sleeve 38 may be run into a wellbore 42 slick or it may incorporate stabilizers 44, such as stabilizer blades, to help center the flex joint 20 in the wellbore 42.

In the embodiment illustrated, the spring assembly 32 is located inside external sleeve 38 between an interior surface of the sleeve and the portion of the first component 26 covered by the external sleeve 38. The preload on spring assembly 32 may be selectively adjusted to change the bending stiffness of the flex joint. For example, if the spring assembly comprises bow springs 34, the preload on the bow springs may be externally adjusted to vary the bending stiffness of first component 26 relative to second component 28.

Depending on the specifics of a given application, additional features may be incorporated into the flex joint 20 such as an electrical feed through 46 positioned within flex joint 20. By way of example, the feed through 46 may comprise a local tool bus (LTB) connection or a multi-pin rotary connection at the top and bottom of the sub forming the flex joint. Additionally, an insulation feature 48, such as an insulation coating, may be applied to first component 26 and second component 28 in a manner which provides electrical insulation between tools or other components above and below the flex joint 20.

The design of the flex joint 20 enables a relatively short profile which helps reduce bending loads on rotary connections above and below the flex joint at high dogleg severities (DLS). This characteristic facilitates running an otherwise DLS-limited tool at a higher DLS. Additionally, the flex joint 20 may be used in both rotating and sliding drilling modes.

Another feature which may be incorporated into flex joint 20 is an actuator or actuators 50, such as a hydraulic actuator or actuators, which cooperate with one or more sensors 52. The sensors 52 may be designed and positioned to sense shock and vibration and to provide data to a control system 54. For example, the sensors 52 may be positioned to sense relative motion, e.g. vibrations, between the first component 26 and the second component 28. The control system 54 also is designed to control hydraulic actuators 50 in a manner which actively reduces vibration and shock during, for example, a drilling operation. The one or more hydraulic actuators 50 may be positioned between external sleeve 38 and the portion of first component 26 covered by sleeve 38.

The sensors 52 also may be selected and utilized to optimize drilling conditions in a manner which proactively reduces shock, vibration, and/or other detrimental effects. In one embodiment, for example, sensors 52 transmit data to control system 54 at a surface location. The data may be transmitted uphole by a suitable telemetry system, such as a measurement-while-drilling type system or a wired drill pipe system. The data from sensors 52 is then processed and evaluated via control system 54 to improve/optimize conditions so as to mitigate shock and vibration. Examples of conditions which may be optimized to proactively reduce detrimental effects include torque, drilling RPM, weight on bit, flow rate, and/or other conditions.

Figure 2:
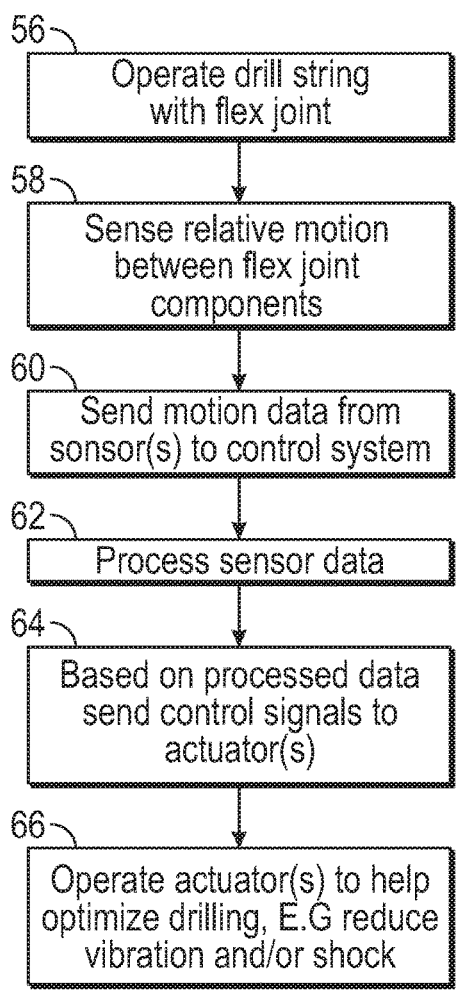
FIG. 2 is a flowchart illustrating an embodiment of a methodology for utilizing the flex joint in controlling detrimental drilling effects, according to an embodiment of the present invention.

Referring generally to FIG. 2, a flowchart is provided to illustrate one embodiment of a methodology for utilizing controlled actuators 50 in cooperation with the flex joint 20 to limit or reduce detrimental effects of a drilling operation. As illustrated by flowchart block 56, drill string 22 includes and is operated with flex joint 20 in a drilling application. One or more sensors 52 is employed to sense relative motion between flex joint components, such as between first component 26 and second component 28, as represented by block 58. However, sensors 52 may be provided on, between, or in proximity to additional or alternate components depending on the structure of the drill string and on the specific parameter or parameters being monitored.

The motion data from sensors 52 is transmitted to control system 54, as represented by block 60. The control system 54 may be located downhole in the drill string 22, or the control system 54 may be located at the surface or at another suitable location. Regardless, the control system 54 is programmed to process the sensor data, as represented by block 62, to facilitate control of the undesirable effect, e.g. vibration and/or shock caused by the drilling operation. Based on the processed data, the control system 54 is employed to send control signals to actuators 50, as represented by block 64. The control signals are designed to operate the one or more actuators 50 in a manner which helps optimize drilling by reducing or eliminating the undesirable effect, e.g. the vibration and/or shock, as represented by block 66. In some embodiments, the actuators 50 comprise hydraulic actuators; however other types of actuators, e.g. electro-mechanical actuators, piezo-electric actuators, may be employed for a given application.

Figure 3:
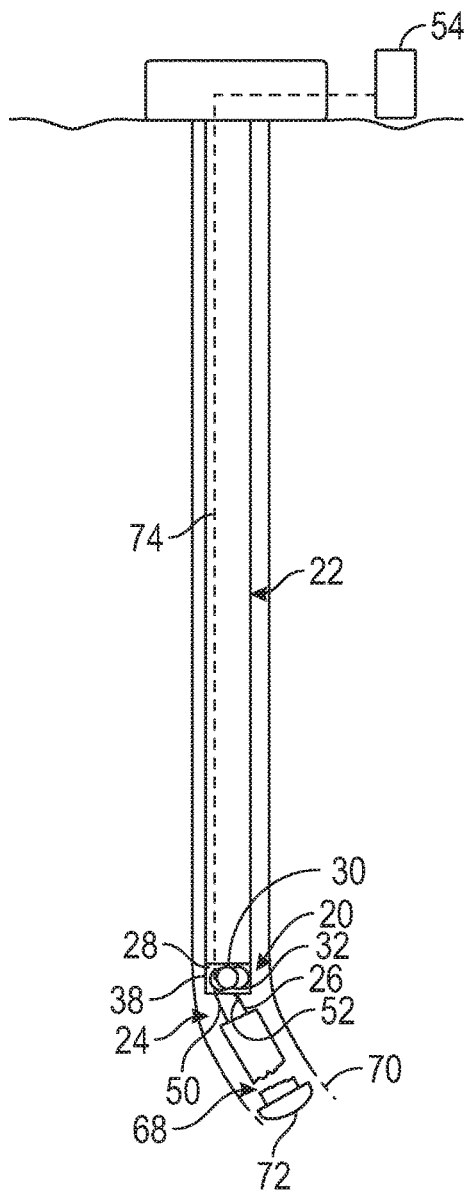
FIG. 3 is a schematic illustration of a drilling system incorporating the flex joint to facilitate directional drilling, according to an embodiment of the present invention.

The flex joint 20 may be utilized in a variety of drilling systems to facilitate many types of drilling operations. In FIG. 3, for example, the drilling system comprises drill string 22 deployed in a lateral wellbore or a multilateral wellbore drilling application. In this example, the drill string comprises bottom hole assembly 24 having a rotary steerable system 68 designed to facilitate drilling of one or more lateral wellbores 70. The rotary steerable system 68 may be any of a variety of types known to those of ordinary skill in the art, and the system 68 is used to orient a drill bit 72 for drilling the lateral wellbore 70 to a desired target.

In this particular example, a plurality of sensors 52 is used to provide data to control system 54 which, in turn, directs control signals to a plurality of hydraulic actuators 50 to reduce the vibration and shock loads that would otherwise result during the lateral wellbore drilling operation. As illustrated, the control system 54 may be positioned at a surface location; however other control system locations may be used and may be selected according to the design of the drilling system and the parameters of a given drilling application. Signals may be communicated between the flex joint 20 and control system 54 via a communication line 74. The communication line 74 may comprise a hardwired line, such as a cable, or a wireless communication line employing a wireless communications methodology, such as mud pulse telemetry.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method, comprising:
constructing a flex joint with a first component pivotably coupled to a second component via a universal joint, the bending stiffness between the first component and the second component being adjustable via an adjustable spring assembly;
coupling the flex joint into a drill string;
adjusting the adjustable spring assembly to provide a desired bending stiffness;
sensing relative motion between the flex joint components via a sensor;
outputting data from the sensor to a control system employed to monitor action of the flex joint;
based on the data, using actuators to adjust operation of the flex joint to reduce undesirable motion; and
limiting the degree of bending of the flex joint with a sleeve and an adjustment mechanism mounted to the sleeve.

2. The method as recited in claim 1, further comprising limiting the degree of bending of the flex joint with a sleeve extending past a universal joint.

3. The method as recited in claim 1, further comprising placing an electrical feed through the flex joint.

4. The method as recited in claim 1, wherein using comprises using a hydraulic actuator in the flex joint to reduce vibration.

5. The method as recited in claim 1, wherein constructing comprises constructing the flex joint with an adjustable bow spring assembly.

6. The method as recited in claim 5, further comprising providing electrical insulation of components of the flex joint.

7. The method as recited in claim 1, wherein coupling comprises coupling the flex joint into a drill string comprising a bottom hole assembly having a rotary steerable system to steer a drill bit.

* * * * *